(12) United States Patent
Warner

(10) Patent No.: US 6,436,212 B1
(45) Date of Patent: Aug. 20, 2002

(54) METHOD OF FORMING A RETURN FLANGE ON AN AUTOMOTIVE TRIM COMPONENT

(75) Inventor: Donald Harold Warner, Rochester Hills, MI (US)

(73) Assignee: Textron Automotive Company Inc, Troy, MI (US)

( * ) Notice: Subject to any disclaimer, the term of this patent is extended or adjusted under 35 U.S.C. 154(b) by 198 days.

(21) Appl. No.: 09/605,309

(22) Filed: Jun. 28, 2000

(51) Int. Cl.⁷ .............................................. B32B 31/16
(52) U.S. Cl. .................... 156/73.1; 156/212; 156/308.2
(58) Field of Search .............................. 156/73.1, 196, 156/212, 290, 308.2, 309.6, 580.1

(56) References Cited

U.S. PATENT DOCUMENTS

| | | | |
|---|---|---|---|
| 4,035,224 A | 7/1977 | Anderson | 156/475 |
| 4,334,947 A | 6/1982 | Zaino | 156/486 |
| 4,563,233 A | 1/1986 | Henderson | 156/479 |
| 4,666,206 A * | 5/1987 | Hough | 296/216 |
| 4,738,069 A | 4/1988 | Williams | 52/658 |
| 5,052,913 A | 10/1991 | Conliffe | 425/394 |
| 5,098,632 A | 3/1992 | Conliffe | 264/339 |
| 5,100,090 A | 3/1992 | Drower | 248/248 |
| 5,118,374 A | 6/1992 | Suwitoadji | 156/216 |
| 5,139,307 A * | 8/1992 | Koops et al. | 296/201 |

* cited by examiner

Primary Examiner—James Sells
(74) Attorney, Agent, or Firm—Grossman, Tucker, Perreault & Pfleger, PLLC

(57) ABSTRACT

A method of forming a return flange on an automotive trim component is provided. The trim component has an inner surface, an outer surface, at least one rib extending from the inner surface, a flange and a hinge. The return flange is formed by contacting the rib with the inner surface of the flange by rotating the flange about the hinge and securing the flange to the rib.

16 Claims, 5 Drawing Sheets

METHOD OF FORMING A RETURN FLANGE ON AN AUTOMOTIVE TRIM COMPONENT

FIELD OF THE INVENTION

The present invention relates to an apparatus and/or a method of forming a return flange on an automotive trim component, particularly at the belt trim portion of an interior door trim panel.

BACKGROUND OF THE INVENTION

Features such as ribs and flanges are frequently integrated into plastic articles to enhance the strength of the article without significantly increasing the bulk of the article or the cost of manufacturing the plastic article. The desirability for ribs and flanges is especially great for automotive trim components. Automotive trim components often require a great deal of strength and durability, both to fulfill the utilitarian functions and to withstand the abuse inflicted by the passengers of the automobile.

The incorporation of flanges into automotive trim components does not always present a problem, but many times the geometry of the trim component will be such that the flange is formed at an orientation relative to the mold which creates an undercut. In other words, an indentation in the trim component lateral to the parting line of the mold that impedes withdrawal of the trim component from the mold. In such an instance, the mold must be equipped with movable parts, such as a slide action, that withdraw before the article is to be ejected.

Slide actions are undesirable in that they greatly increase the complexity of the mold, and therefore all the associated expenses. Molds with slide actions are more difficult to design, and much more costly to manufacture. Slide action molds also require a great deal more maintenance, and are subject to more down-time due to the increased number of moving parts. It is therefore desirable to produce a part having a flange formed without necessitating the use of mold slide actions.

U.S. Pat. No. 5,098,632 recites a method for forming a return flange on the belt trim portion of a vehicle door panel which includes the steps of locating the door panel on a holding fixture to place the belt trim portion for sequential clamping, backing, spot heating and folding to form the return flange thereon. The '632 Patent also recites a vehicle door panel with a return flange on the belt trim support thereof which is formed without requiring special retractable injection mold tooling for releasing a die locked return flange from the mold apparatus.

While suitable for most cosmetic applications, the return flange recited in the '632 Patent does not provide any structure to which the return flange may be joined after being formed. Consequently, it has been found that the return flange disclosed in the '632 Patent may distort and otherwise move from its final intended position when used in its environment. What is needed is a return flange with supporting structure and a method for creating such which addresses the aforementioned problem.

SUMMARY OF THE INVENTION

According to one aspect of the invention, a method of forming a return flange on an automotive trim component is provided. The method comprises providing a trim component having an inner surface, an outer surface, at least one rib extending from the inner surface, a flange and a hinge; and contacting the rib with the inner surface of the flange.

In apparatus form, the present invention comprises an automotive trim component comprising an inner and outer surface and at least one rib extending from said inner surface, including a flange with a corresponding inner and outer surface and a hinge section, wherein said inner surface of said flange contacts said rib.

According to another aspect of the invention, the trim component is an interior door trim panel and the flange is located along the belt trim of the interior door trim panel.

According to another aspect of the invention, the hinge is integrally formed with the trim component.

According to another aspect of the invention, the hinge comprises a living hinge made from a polyolefin material.

According to another aspect of the invention, the hinge is adjacent a line of mechanical weakness. More preferably, the line of mechanical weakness comprises a reduced cross-sectional thickness and, even more preferably, a V-notch.

According to another aspect of the invention, the flange is secured to the rib by fusion bonding. More preferably, the fusion bonding is accomplished by welding and, even more preferably, by ultrasonic welding.

According to another aspect of the invention, the flange is secured to the rib by adhesive bonding.

DETAILED DESCRIPTION OF THE PREFERRED EMBODIMENT

It will be appreciated by those skilled in the art that, although the following detailed description will proceed with reference being made to preferred embodiments, the present invention is not intended to be limited to these preferred embodiments.

Figure 1:
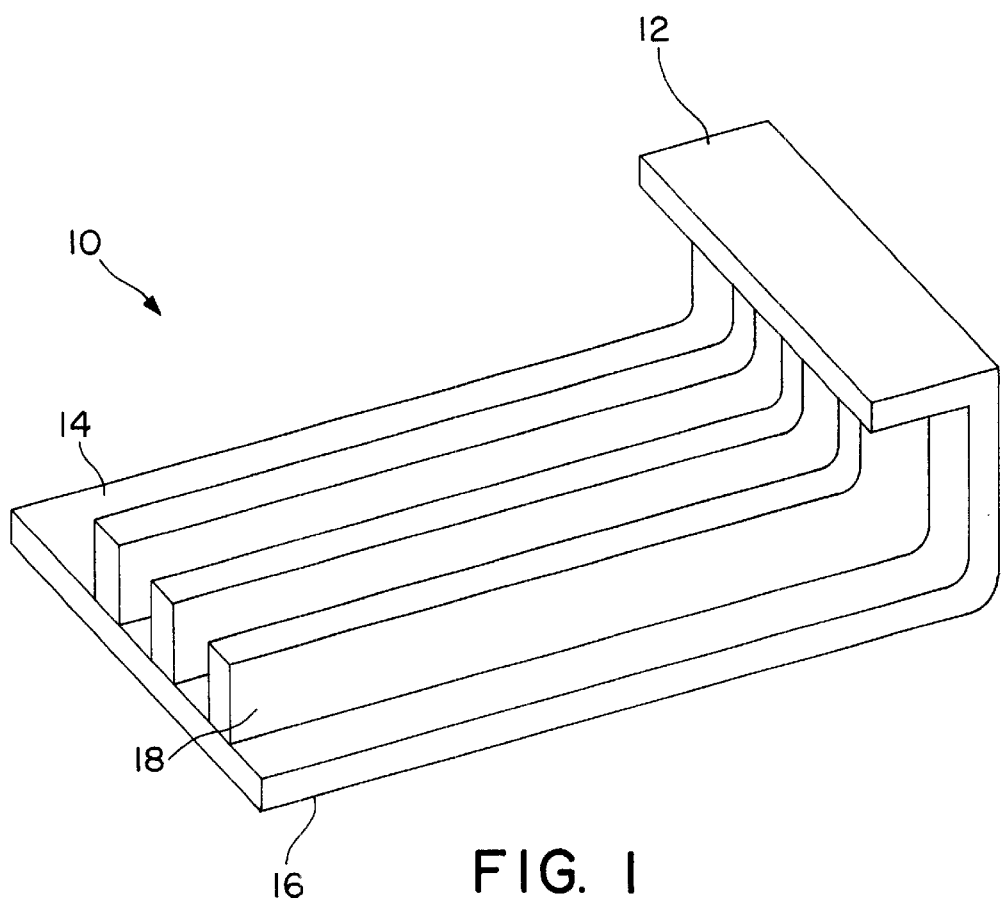
FIG. 1 illustrates in perspective view an exemplary trim component upon which a return flange has been formed.
Figure 2:
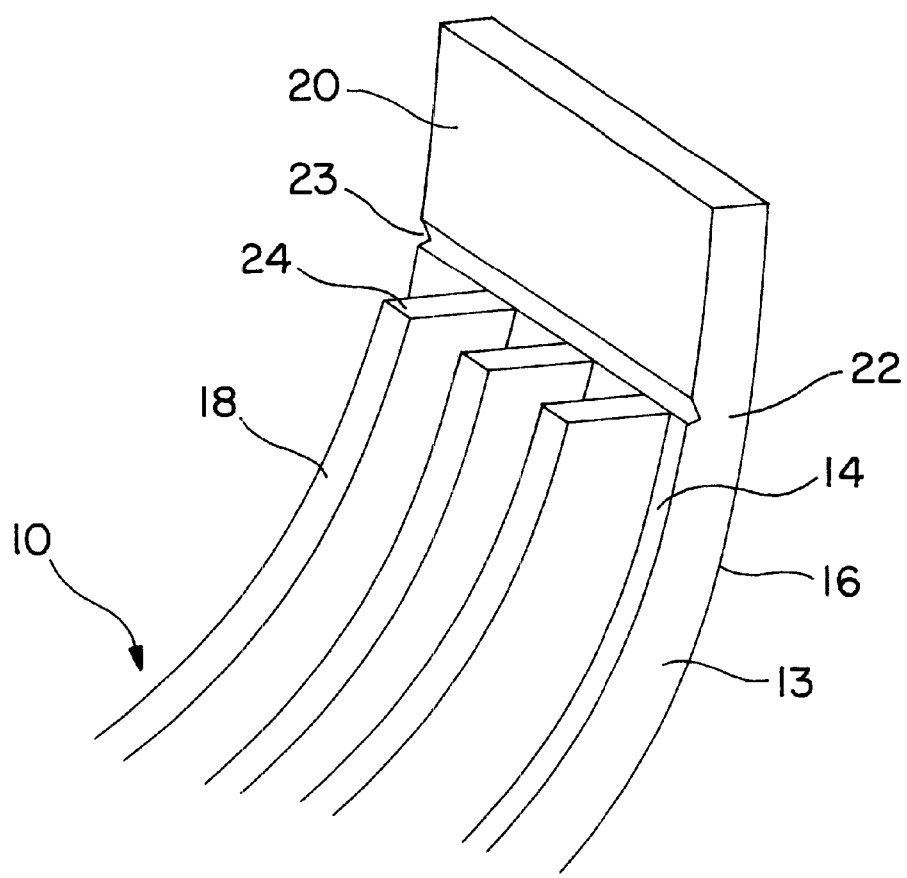
FIG. 2 is a perspective view of a trim component prior to forming a return flange.
Figure 3:
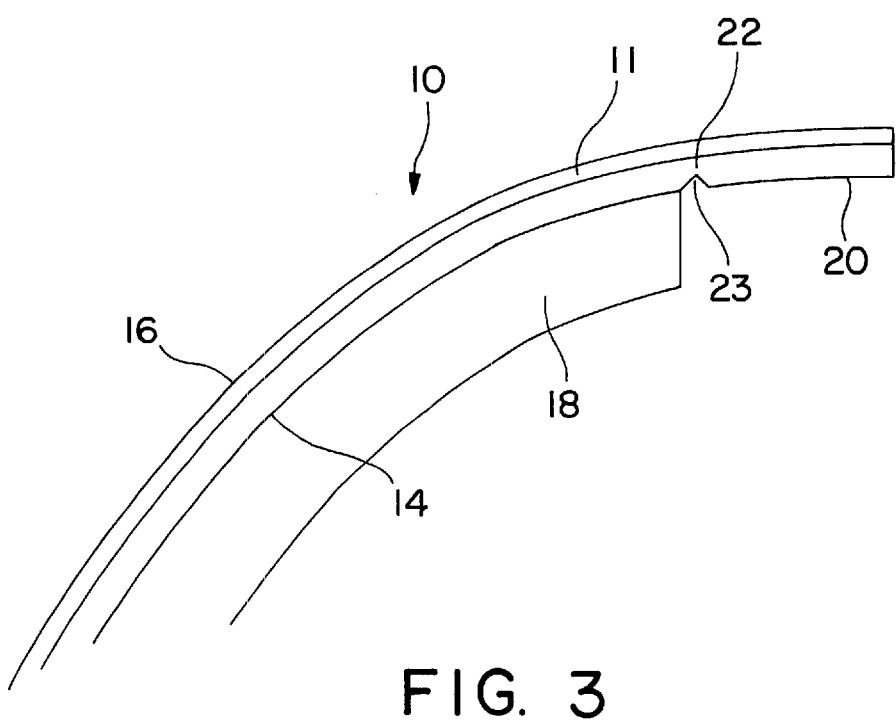
FIG. 3 is a side elevation of a trim component prior to forming a return flange.

With reference to the drawings, FIG. 1 illustrates in perspective view an exemplary trim component 10 made by the process described herein. Preferably, trim component 10 is an interior door trim panel and, more specifically, the belt trim portion of the interior door trim panel. Trim component 10 is preferably formed using an plastic injection molding process and a thermoplastic such as polypropylene. Other processes may include, but are not limited to, injection-compression molding, stamping, thermoforming and blow molding, FIG. 2 depicts in perspective view the exemplary automotive trim component 10 prior to formation of the return flange. The trim component 10 comprises a generally flat or curved wall 13 having an inner surface 14 and an outer surface 16. Inner surface 13 is generally not visible to vehicle occupants while outer surface 16 is normally exposed. Alternatively, outer surface 16 may be at least partially covered with a decorative layer 11 of skin and/or a foam to further the aesthetic appeal of trim component 10.

Where a decorative layer 11 is used, preferably it comprises a polyvinyl chloride outer skin in combination with a polymeric foam, such as urethane or olefin.

Projecting off of the inner surface 14 of wall 13 of trim component 10 is at least one, but as shown, preferably a plurality of longitudinal ribs 18. The ribs 18 do not extend to the edge of trim component 10, but rather are displaced from the edge of the trim component by a flange portion 20 that is preferably formed substantially coplanar with the wall 13 of the trim component 10. The flange portion 20 is further delineated by a hinge 22 in the trim component 10. The hinge 22 is generally transverse to the axis of the ribs 18 and disposed at about the line on the trim component 10 at which ribs 18 end. More preferably, the hinge 22 is a hinge formed integral with the trim component 10 and more preferably comprises a living hinge made from a polyolefin material, preferably polypropylene.

Preferably, each of the ribs 18 terminate in a generally flat end face 24, that is the end face 24 does not contain a significant curvature. Preferably, the end face 24 of ribs 18 is configured normal to wall 13 of trim component 10 at the point of termination of the ribs 18, as illustrated in FIG. 2. However, the end face 24 of rib 18 may be angled other than normal to wall 13 at the point of termination of the ribs 18.

Preferably, the hinge 22 is adjacent a line of mechanical weakness 23 that further facilitates pivotal bending generally about the axis of the hinge 22. Preferably the hinge 22 is adjacent a line of reduced cross-sectional thickness, therein resulting in a line of mechanical weakness 23. This line of reduced cross-sectional thickness provides for the rotation of flange portion 20 relative to the remainder of trim component 10.

Figure 5A:
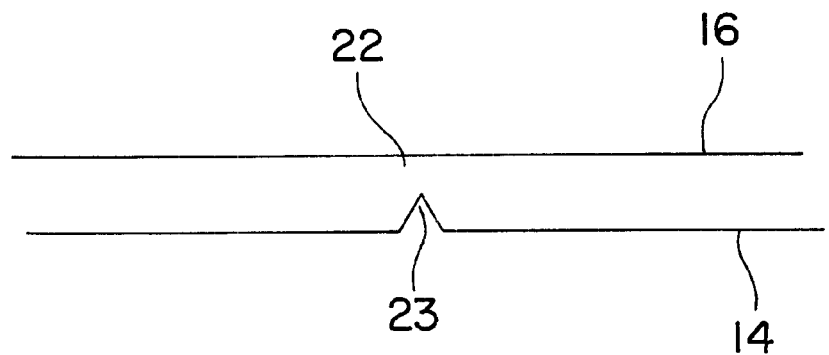
FIGS. 5A–C show, in side elevation, three embodiments of a hinge.
Figure 5B:
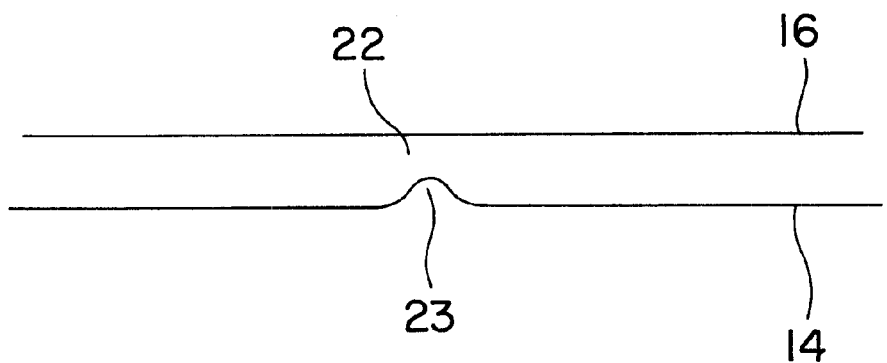
Figure 5C:
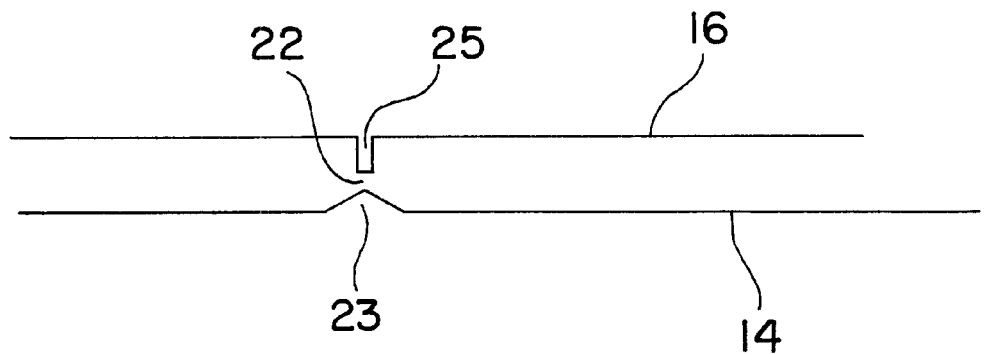

Preferably, line of mechanical weakness 23 is present as a notch or groove on either the inner surface 14 or the outer surface 16 of trim component 10, as shown in side elevation in FIGS. 5A and 5B. The notch or groove is preferably either a V-shaped notch or a rounded groove formed on the inner surface 14 of trim component 10. The line of mechanical weakness 23 may also comprise a groove, notch or cut line on the outer surface 16 of trim component 10.

As illustrated in FIGS. 1–5B, line of mechanical weakness 23 extends from the inner surface 14 of trim component 10 into wall 13. However, line of mechanical weakness may alternatively extend from the outer surface 16 of trim component 10 into wall 13. Also, rather than a single line of mechanical weakness extending into wall 13 from either inner surface 14 or outer surface 16, both may be used in conjunction. As illustrated in FIG. 5C, in a further embodiment, trim component 10 may comprises a line of mechanical weakness 23 on the inner surface 14 and a line of mechanical weakness 25 on the outer surface 16 of trim component 10. Exemplary lines of mechanical weakness 23, 25 of this embodiment are a V-notch on the inner surface 14 of trim component 10 and a cut line on the outer surface 16.

Hinge 22 and line of mechanical weakness 23 are preferably formed during the forming operation of trim component 10 or, alternately, during a secondary operation subsequent to the primary forming operation of trim component 10. Preferred secondary forming operations include, but are not limited to, cutting or stamping.

Figure 4:
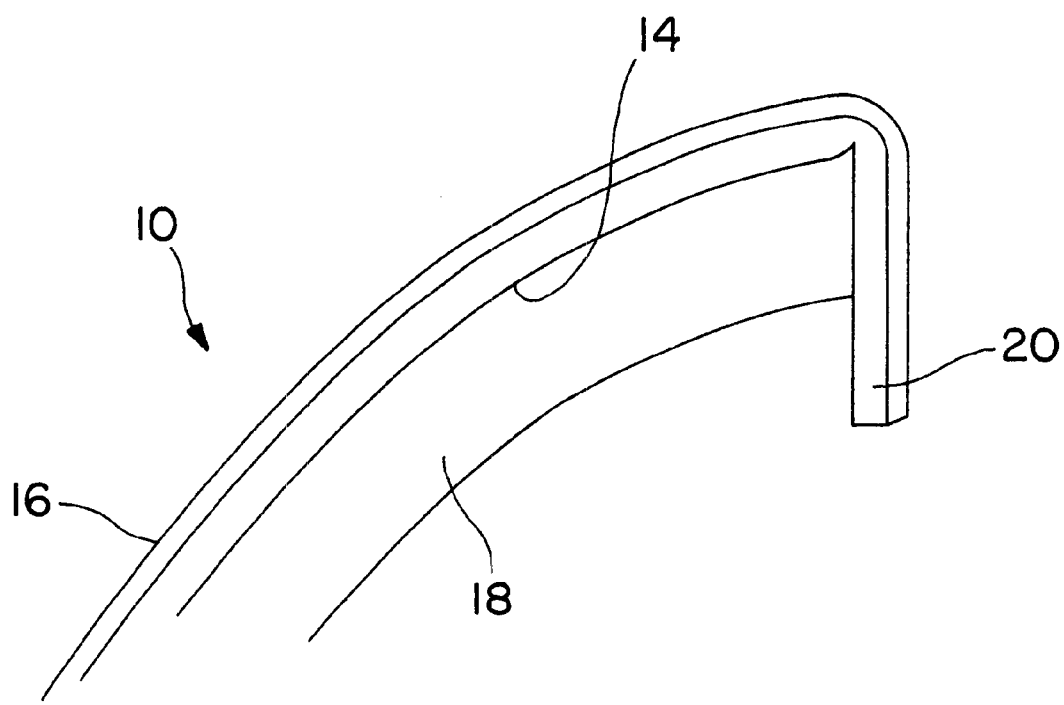
FIG. 4 is a side elevation of a trim component with a completed return flange.

The return flange configuration, illustrated in FIGS. 1 and 4, is formed on trim component 10 by pivotally rotating flange portion 20 about hinge 22. Flange portion 20 is rotated towards ribs 18 until the inner surface 14 of flange portion 20 contacts the end face 24 of ribs 18. Flange portion 20 is then preferably attached to ribs 18 about at least a portion of each rib face 24.

Attachment or securing of flange portion 20 to ribs 18 may be accomplished using a variety of techniques. Preferably, flange portion 20 is attached to ribs 18 by fusion bonding (i.e. creating a thin layer of melt on at least one of the plastic surfaces to be joined which subsequently cools and bonds the surfaces). More preferably, the fusion bonding is accomplished by welding and more preferably by ultrasonic welding. When attachment occurs through ultrasonic welding it is desirable to incorporate energy directors onto one of the mating surfaces. Preferably, energy directors are located on the end face 24 of ribs 18. Energy directors will typically be present as triangular or pointed protrusions. Alternate means of attachment include adhesive bonding and other fusion bonding techniques such as vibration welding, high-frequency welding, electromagnetic welding, induction welding, friction welding, hot-gas welding, hot-plate welding and heat staking.

The size and configuration of the finished flange 12 is determined by several factors. The first factor is the length of flange portion 20, wherein by length it is meant the distance which flange portion 20 extends beyond the terminus of the ribs 18. The greater the length of flange portion 20, the greater will be the height of the finished flange 12. The angle of the finished flange 12 is determined by the position of the hinge 22 and the angle of the end face 24 of ribs 18 relative to the wall 13 of trim component 10. The angle of the finished flange 12 is the angle between the hinge 22 and the contact point on the ribs 18. Therefore, if the hinge 22 is at the terminus of ribs 18, the finished flange 12 will follow the angle of the end face 24 of ribs 18. However, if the hinge 22 is located distal the terminus of ribs 18, the angle of the finished flange will be the angle between the hinge 22 and the contact between the inner surface of the flange portion 20 with the ribs 18.

Those skilled in the art will appreciate that still other modifications and variations of the present invention are possible in light of the above teachings. It is, therefore, to be understood that within the scope of the appended claims, the invention may be practiced otherwise than literally described, but fall within the scope therein.

What is claimed is:

1. A method of forming a return flange on an automotive trim component, the method comprising:
    providing a trim component having an inner surface, an outer surface, at least one rib extending from the inner surface, a flange and a hinge; and
    contacting the rib with the inner surface of the flange by rotating the flange about the hinge.

2. The method of claim 1, wherein the trim component is an interior door trim panel.

3. The method of claim 2, wherein the flange is located along the belt trim of the interior door trim panel.

4. The method of claim 1, wherein the hinge is integrally formed with the trim component.

5. The method of claim 1, wherein the hinge comprises a living hinge.

6. The method of claim 5, wherein said living hinge is made of polypropylene.

7. The method of claim 1, wherein the hinge is adjacent a line of mechanical weakness.

8. The method of claim 7, wherein the line of mechanical weakness comprises a reduced cross-sectional thickness.

9. The method of claim 8, wherein the reduced cross-sectional thickness comprises a V-notch.

10. The method of claim 1, wherein the flange is secured to the rib by fusion bonding.

11. The method of claim 10, wherein the fusion bonding is accomplished by welding.

12. The method of claim 11, wherein the welding is accomplished by ultrasonic welding.

13. The method of claim 10, wherein the flange is secured to the rib by heat staking.

14. The method of claim 1, wherein the flange is secured to the rib by adhesive bonding.

15. The method of claim 1, including the step of securing said flange to said rib.

16. The method of claim 1, including providing a trim component comprising a plurality of ribs and contacting said plurality of ribs with said flange.

* * * * *